(12) United States Patent
Andres et al.

(10) Patent No.: US 7,565,229 B2
(45) Date of Patent: Jul. 21, 2009

(54) METHOD AND SYSTEM FOR DETECTING MALFUNCTIONING SENSORS

(75) Inventors: Robert M. Andres, Clarkston, MI (US); Jeffrey D. Gleacher, West Bloomfield, MI (US)

(73) Assignee: Continental Automotive Systems US, Inc., Auburn Hills ( * ) Notice: Subject to any disclaimer, the term of this patent is extended or adjusted under 35 U.S.C. 154(b) by 478 days.

(21) Appl. No.: 11/348,629

(22) Filed: Feb. 7, 2006

(65) Prior Publication Data

US 2006/0181066 A1    Aug. 17, 2006

Related U.S. Application Data

(60) Provisional application No. 60/654,157, filed on Feb. 17, 2005, provisional application No. 60/654,134, filed on Feb. 17, 2005.

(51) Int. Cl.
*B60R 21/01* (2006.01)
*G06F 19/00* (2006.01)

(52) U.S. Cl. ........................................... 701/34; 701/45

(58) Field of Classification Search ................... None
See application file for complete search history.

(56) References Cited

U.S. PATENT DOCUMENTS

| | | | |
|---|---|---|---|
| 6,487,482 B1 * | 11/2002 | Mattes et al. | 701/45 |
| 2002/0135168 A1 * | 9/2002 | Mattes et al. | 280/735 |
| 2003/0127270 A1 * | 7/2003 | Mattes et al. | 180/274 |
| 2004/0050610 A1 * | 3/2004 | Kawasoe et al. | 180/282 |
| 2005/0004729 A1 * | 1/2005 | Gleacher et al. | 701/38 |
| 2006/0164227 A1 * | 7/2006 | Auer et al. | 340/457.1 |

FOREIGN PATENT DOCUMENTS

WO    WO 2004/039639 A1 *    5/2004

* cited by examiner

*Primary Examiner*—Michael J. Zanelli

(57) ABSTRACT

A method of operating a sensor system includes the steps of determining whether any of a plurality of sensors are malfunctioning in response to a physical stimulus on a vehicle, determining whether an outcome of the first step is plausible based upon expected physical stimuli, and determining whether to execute a decision, such as deploy a vehicle occupant restraint, or fail the sensor if it is producing signals beyond expected physical limits. The decision is executed if it is plausible and not executed if it is not plausible.

15 Claims, 1 Drawing Sheet

METHOD AND SYSTEM FOR DETECTING MALFUNCTIONING SENSORS

This application claims priority to U.S. Provisional Application Nos. 60/654,157 and 60/654,134, which both were filed on Feb. 17, 2005.

BACKGROUND

This invention relates to sensor systems and, more particularly, to vehicle sensor systems.

Sensor systems are widely known and used in vehicles and other applications for making algorithmic decisions in response to sensor measurements. A vehicle crash sensor system, for example, utilizes sensors to measure vehicle deceleration, relative pressure changes within a cavity, or other physical behaviors on the vehicle to decide whether to deploy one or more vehicle occupant restraints.

On occasion, one or more of the sensors used in the sensor system may malfunction because of an electrical failure, damage to the sensing elements of the sensor, or other reason. A malfunctioning sensor may produce measurements that do not represent the actual vehicle movement. For example, a sensor that detects vehicle roll-over may malfunction and cause an airbag deployment decision on an upright vehicle, or a sensor that measures the vehicle lateral deceleration may malfunction and cause a side airbag deployment decision on a stationary vehicle.

A plausibility check has traditionally been used to prevent deployment decision from executing in the case of a single sensor malfunction. For example, once an algorithm gives a deployment decision, there must be agreement between two of the sensors that the vehicle is in a crash condition in order to execute the deployment decision. Thus, at least two of the sensors must produce measurements that indicate a vehicle crash to deploy the vehicle airbag. However, conventional plausibility methods are often too sensitive and may be fulfilled under relatively normal driving conditions. For example, a vehicle driving over large bumps or potholes, or aggressive cornering, may cause one or more of the sensors to meet plausibility which could allow a malfunctioning sensor to trigger an occupant restraint to deploy. Even the slamming of a door could meet the plausibility conditions for a side airbag deployment if a side crash sensor is malfunctioning.

There are known sensor diagnostic methods that can be used to detect some sensor failures. One such method detects a failed sensor when it's offset drifts out of an acceptable range. Such methods usually take a relatively long time to detect and qualify. During the detection and qualification time there is a risk that the failing sensor is giving "crash-like" output and that plausibility could be met from another sensor thereby triggering an undesired occupant restraint deployment. Accordingly, it is desired to detect malfunctioning sensors as quickly as possible thereby minimizing the risk window of an undesired restraint deployment.

SUMMARY

A method of operating a sensor system according to the present invention includes the steps of determining whether any vehicle sensors are malfunctioning in response to a physical stimulus on a vehicle, determining whether the outcome of the first step is plausible based upon expected physical stimulus, and determining whether to execute the decision or fail the sensor.

One example sensor system according to the present invention includes a plurality of sensors that produce vehicle sensor signals that represent physical stimuli. A microprocessor module is in communication with the plurality of sensors. The microprocessor module is configured to determine an occupant restraint deployment decision in response to the vehicle sensor signals and determine a plausibility of the occupant restraint deployment decision based upon expected physical stimuli. If a sensor indicates physical stimuli beyond physical expectations then the sensor may be detected as failed.

A method for use with the sensor system according to the present invention includes sensing the physical stimuli to produce sensor values that represent physical stimuli, comparing each of the sensor values to the corresponding threshold zone, changing a counter value in response to one of the sensor values being outside of the corresponding threshold zone, and determining whether any of the sensors are malfunctioning based upon the counter value.

The above examples are not intended to be limiting. Additional examples are described below.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
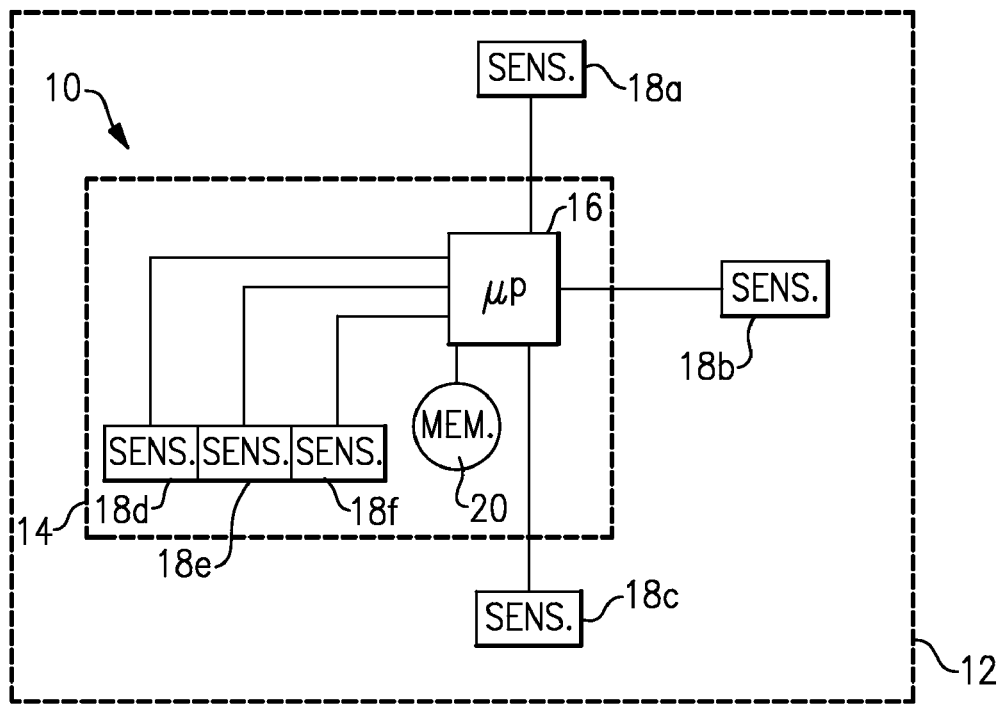
FIG. 1 is a simplified schematic view that illustrates an example sensor system in a vehicle.

FIG. 1 illustrates selected portions of an example sensor system 10. In this example, the sensor system 10 operates in a vehicle 12 to control deployment of one or more occupant restraints, such as vehicle airbags. The sensor system 10 includes a control module 14 having a microprocessor 16. The microprocessor 16 is in electrical communication with sensors 18a, 18b, 18c, 18d, 18e, and 18f, such as longitudinal accelerometers, lateral accelerometers, and roll-over angular rate sensors. The microprocessor 16 is also in communication with a non-volatile memory 20 for storing information received from the sensors 18a, 18b, 18c, 18d, 18e, and 18f along with other information.

The sensors 18a, 18b, 18c, 18d, 18e, and 18f produce sensor signals in response to physical stimulus of the vehicle 12 such as vehicle movement. The microprocessor 16 receives the sensor signals, such as pressure change, rotation, and/or acceleration. The microprocessor 16 processes these inputs, for example, in an algorithm to determine whether or not to deploy a vehicle occupant restraint in a known manner.

The vehicle occupant restraint deployment process generally includes first deciding whether or not to deploy the occupant restraint, and second, determining a plausibility of the decision to deploy the occupant restraint to prevent deployment in the case of a sensor malfunction. If the decision is plausible, the decision is executed. If the decision is not plausible, the microprocessor 16 does not execute the decision. The plausibility depends upon expected physical stimuli on the vehicle. This provides the benefit of preventing the occupant restraint from deployment under non-crash conditions from a malfunctioning sensor as described below.

One example method to detect malfunctioning sensors includes calculating a damped integration of each sensor 18a, 18b, 18c, 18d, 18e, and 18f signal. In the following examples, the sensor 18a signal is used; however, the damped integration is similar for each sensor 18a, 18b, 18c, 18d, 18e, and 18f. The damped integration entails integrating the sensor 18a signal to produce an integrated value and subtracting an offset value with each iteration to produce a damped value. The offset value is preset to correspond to expected normal driving conditions, such as from collected driving data over a variety of terrain and driving conditions and specified sensor tolerances. The microprocessor 16 compares the damped integration to a fixed threshold value. If the damped integration exceeds the threshold value, the microprocessor 16 concludes that the sensor 18a is malfunctioning.

For example assuming sensor 18a is an accelerometer, the integration of its acceleration signal results in velocity. Integrating the acceleration with a small offset produces a damped velocity. If the vehicle's damped velocity change, as indicated by sensor 18a, is too large (i.e. exceeds a threshold), the microprocessor 16 concludes that the sensor 18a is malfunctioning. In other words, if the sensor 18a measures accelerations beyond normal expected physical limitations of the vehicle 12, the sensor 18a is malfunctioning.

In one example, an offset value for an accelerometer is 2 g and the failure threshold for the damped velocity is set to 100 mph. There are only 2 ways the vehicle's accelerometer can achieve 100 mph damped velocity. One way is by a severe crash and the other is by a malfunctioning sensor. If it were a severe crash the crash detection algorithm would have deployed the necessary occupant restraints long before the 100 mph threshold was met. If it was a failed sensor, the restraint deployment would be prevented because all other sensors would not meet plausibility levels. Likewise, corresponding offset values and failure thresholds are used for other types of sensors. Considering angular rate sensors, an offset of 10 degrees/second and a failure threshold of 180 degrees could be appropriate depending on the sensor specifications. In this example, if the damped angle reaches 180 degrees, either the vehicle has rolled over on to or beyond its roof, or the angular rate sensor is malfunctioning. The rollover detection algorithm is expected to deploy restraints well before a damped angle of 180 degrees is achieved.

If the microprocessor 16 determines that any one of the sensors 18a, 18b, 18c, 18d, 18e, and 18f is malfunctioning, the microprocessor 16 selects one or more output actions. In one example, the microprocessor 16 illuminates a warning light in the vehicle cabin. In another example, the microprocessor 16 sets a failure code in the non-volatile memory 20, and prevents the sensor's signal from being used by any algorithm. In another example, the microprocessor 16 completely disables the algorithm that decides whether or not to deploy the occupant restraints.

In another example, the sensor diagnostic method is modified to be more aggressive under certain conditions. For example, the vehicle speed is used to determine the method of integration. In many cases, the vehicle speed may be available to the microprocessor 16. This information may be used to determine that the vehicle is moving. Under this condition, the microprocessor 16 utilizes the previously described signal integration method. If the vehicle speed information indicates to the microprocessor 16 that the vehicle is not moving, the microprocessor 16 uses a more aggressive signal integration method. The integration is made more aggressive by using the absolute value of the sensor signals. That is, since the vehicle is not moving, there should not be oscillation of the sensor signals between positive and negative sensor signals. By using the absolute value, the calculated damped integration can grow toward the threshold value regardless of the sign of the sensor signal. This provides for the quick detection of malfunctioning sensors that increasingly oscillate about a zero point.

An alternative method to detect malfunctioning sensors includes monitoring the sensor signals relative to threshold zones and relative to all other sensors in the system. In one example, a sensor's fail counter is increased when its signal (i.e., angular rate or acceleration) is outside of its corresponding threshold zone. The threshold zone for each of the sensors 18a, 18b, 18c, 18d, 18e, and 18f is preset, depending upon expected driving conditions and specified sensor 18a, 18b, 18c, 18d, 18e, and 18f tolerances. If the sensor signal comes back within the threshold zone, the sensor's fail counter is decreased. The sensor's fail counter is reset when one of the other sensor signals goes outside of its respective threshold zone. Thus, for the counter of sensor 18a to exceed its predetermined counter threshold, the other sensors 18b, 18c, 18d, 18e, or 18f must remain inside their respective threshold zones. Once the sensor's fail counter exceeds a predetermined counter threshold, the microprocessor 16 fails the sensor and selects an output action, as described above.

Figure 2:
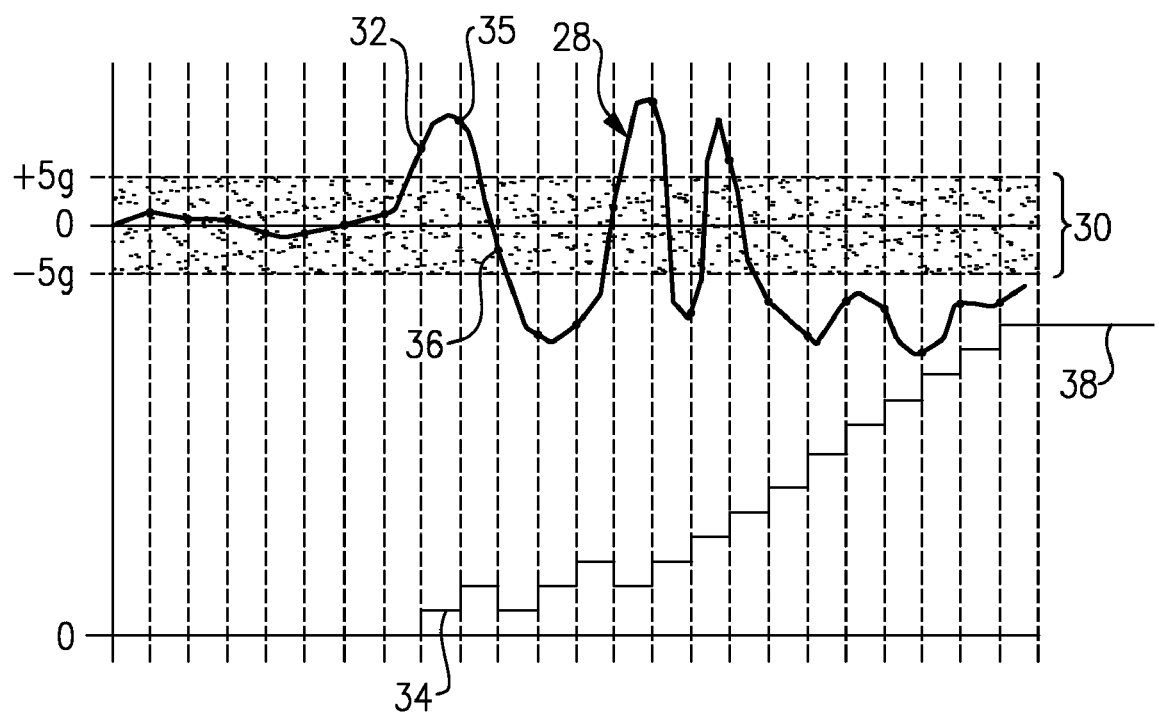
FIG. 2 is a graph illustrating one example of increasing or decreasing a counter value in response to a vehicle sensor signal.

FIG. 2 illustrates one example operation of this sensor diagnostic method for an accelerometer 18. In this example, a sensor signal 28 is represented in physical units of acceleration (i.e. 1 g=9.81 m/s$^2$). A threshold zone 30 extends between positive 5 g and negative 5 g. It is to be understood that the size of the threshold zone 30 can be varied based upon the type of sensor 18, sensitivity of the sensor 18, and the expected driving conditions of the vehicle 12.

The sensor signal begins on the left in FIG. 2 inside of the threshold zone 30. The sensor signal leaves the threshold zone 30 at the point 32, causing the counter to increase by one increment (shown by line 34). At point 35, the sensor signal remains outside of the threshold zone 30 and the counter increases by another increment. At point 36, the sensor signal returns to the threshold zone 30 and the counter is decreased by an increment. In the illustrated example, the sensor signal continues to oscillate into and out of the threshold zone 30 until the counter reaches the predetermined counter threshold 38. In response to reaching the predetermined counter threshold 38, the microprocessor 16 selects one of the output actions as described above.

In the above example, the counter increases or decreases by one increment, depending on whether the sensor signal is inside of or outside of the threshold zone 30. Alternatively, the counter increases or decreases by more than one increment to achieve a fast charge, slow discharge or a slow charge, fast discharge. Given this description, one of ordinary skill in the art will recognize counter configurations to suit their particular needs.

Although a preferred embodiment of this invention has been disclosed, a worker of ordinary skill in this art would recognize that certain modifications would come within the scope of this invention. For that reason, the following claims should be studied to determine the true scope and content of this invention.

We claim:
1. A method for use with a sensor system, comprising:
    (a) determining whether any of a plurality of sensors are malfunctioning in response to a physical stimulus on a vehicle;
    (b) determining whether an outcome of step (a) is plausible based upon an expected physical stimulus; and
    (c) determining whether to execute a decision in response to step (b), wherein the decision is executed if the outcome of step (b) is plausible and at least one sensor is responsive to an unexpected physical stimulus and the decision is not executed if the outcome of step (b) is not plausible.

2. The method as recited in claim 1, wherein the decision of step (c) is to deploy a vehicle occupant restraint.

3. The method as recited in claim 1, wherein step (a) includes whether any of a plurality of sensors are malfunctioning in response to a plurality of vehicle sensor signals indicative of the physical stimulus on the vehicle.

4. The method as recited in claim 3, including the step of executing the decision in response to at least one of the plurality of vehicle sensor signals representing the expected physical stimulus.

5. The method as recited in claim 3, including the step of not executing the decision in response to at least one of the plurality of vehicle sensor signals representing the unexpected physical stimulus.

6. The method as recited in claim 1, wherein the unexpected physical stimulus exceeds normal physical limitations.

7. The method as recited in claim 1, wherein the expected physical stimulus is within normal physical limitations.

8. A method for use with a sensor system, comprising:
(a) determining whether any of a plurality of sensors are malfunctioning in response to a plurality of vehicle sensor signals indicative of a physical stimulus on a vehicle;
(b) determining whether an outcome of step (a) is plausible based upon an expected physical stimulus; and
(c) determining whether to execute a decision in response to step (b), wherein the decision is executed if the outcome of step (b) is plausible and at least a pair of the plurality of vehicle sensor signals representing the expected physical stimulus and at least one other of the plurality of vehicle sensor signals is responsive to an unexpected physical stimulus and the decision is not executed if the outcome of step (b) is not plausible.

9. A method for use with a sensor system, comprising:
(a) determining whether any of a plurality of sensors are malfunctioning in response to a plurality of vehicle sensor signals indicative of a physical stimulus on a vehicle and representing each of the plurality of vehicle sensor signals as an output and integrating the output to produce an integrated value;
(b) determining whether an outcome of step (a) is plausible based upon an expected physical stimulus; and
(c) determining whether to execute a decision in response to step (b), wherein the decision is executed if the outcome of step (b) is plausible and the decision is not executed if the outcome of step (b) is not plausible.

10. The method as recited in claim 9, including the step of determining whether the vehicle is stationary and integrating an absolute value of the output to produce the integrated value in response to the vehicle being stationary.

11. The method as recited in claim 9, including the step of determining a difference between the integrated value and an offset value to produce a damped value.

12. The method as recited in claim 11, including the step of comparing the damped value to an expected value that represents an expected physical stimulus.

13. The method as recited in claim 11, including the step of not executing the decision in response to the damped value exceeding an expected value.

14. A sensor system comprising:
a plurality of sensors that produce vehicle sensor signals that represent physical stimuli on a vehicle; and
a microprocessor module in communication with the plurality of sensors, wherein the microprocessor module is configured to determine an occupant restraint deployment decision in response to at least a pair of the plurality of vehicle sensor signals representing an expected physical stimulus and at least one other of the plurality of vehicle sensor signals representing an unexpected physical stimulus and determine a plausibility of the occupant restraint deployment decision based upon expected physical stimulus.

15. The system as recited in claim 14, wherein the microprocessor module is located in a control module, and the plurality of sensors include first sensors located in the control module and second sensors located remote from the control module.

* * * * *